(12) United States Patent
Karnick et al.

(10) Patent No.: US 7,412,775 B1
(45) Date of Patent: Aug. 19, 2008

(54) GYROSCOPE NORTH SEEKER SYSTEM AND METHOD

(75) Inventors: Drew A. Karnick, Blaine, MN (US); Timothy J. Hanson, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/833,398

(22) Filed: Aug. 3, 2007

(51) Int. Cl.
*G01C 19/38* (2006.01)
*G01C 19/02* (2006.01)
(52) U.S. Cl. .............................. 33/324; 33/316; 33/318
(58) Field of Classification Search .................. 33/321, 33/323–324, 313, 316, 318
See application file for complete search history.

(56) References Cited

U.S. PATENT DOCUMENTS

| 3,961,535 | A | * | 6/1976 | Blitz ....................... 73/504.08 |
| 5,272,922 | A | | 12/1993 | Watson |
| 5,349,855 | A | | 9/1994 | Bernstein et al. |
| 7,036,373 | B2 | | 5/2006 | Johnson et al. |
| 7,213,343 | B2 | * | 5/2007 | Glantz et al. .................. 33/290 |
| 2007/0106457 | A1 | * | 5/2007 | Rosenberg .................... 33/352 |

* cited by examiner

*Primary Examiner*—Yaritza Guadalupe-Mccall
(74) *Attorney, Agent, or Firm*—Fogg & Power LLC; Gregory M. Taylor

(57) ABSTRACT

A sensor system and method for determining a relative direction to true north is provided. The system comprises at least one angular rate sensor, such as a MEMS sensor, which has an input axis and a rotation axis. The sensor comprises a motor drive structure, a motor signal output from the motor drive structure, a gyroscope, and a sensor rate output from the gyroscope for a sensor rate signal. A frequency divider is in operative communication with the motor signal output, and a spinning device is coupled to the angular rate sensor. A spinning device motor is coupled to the spinning device and is in operative communication with the frequency divider. The spinning device motor has an axis of rotation that is substantially perpendicular to the input axis of the sensor. The spinning device motor is configured to be driven by a periodic signal from the sensor. A position of the spinning device is synchronized to the periodic signal to generate a spinning device position signal. A phase detector is in operative communication with the spinning device motor and with the sensor rate output. The relative direction to true north is determined from a phase differential between the spinning device position signal and the sensor rate signal.

20 Claims, 4 Drawing Sheets

GYROSCOPE NORTH SEEKER SYSTEM AND METHOD

BACKGROUND

Many ground-based navigation applications require directional knowledge. Examples of such applications include aiming/targeting techniques (e.g., for mortar/artillery), navigation of autonomous ground vehicles, and surveying techniques. An important piece of information for use in ground-based navigation is knowledge of one's direction relative to the desired path of travel along the surface of the earth.

Conventional techniques for obtaining directional knowledge include using magnetic compasses, the Global Positioning System (GPS), gyroscopes, and radio signals. These techniques all present certain disadvantages. Magnetic compasses require local calibrations to obtain even marginal accuracy. The GPS requires supporting electronics and cannot be used underground. The GPS also requires the user to be moving, and is susceptible to local area jamming. Conventional gyroscopes are typically too large and expensive given accuracy needs.

North-seeking gyroscopes or gyrocompasses have been developed and are traditionally characterized by reference to a freely rotating gyroscope rotor having damped precession about its own axis of rotation which naturally aligns parallel to the earth's axis of rotation and perpendicular to the local centripetal acceleration vector due to the effective torque induced by the horizontal component of the coriolis force. However, because the rate of change of the gyroscope's angular momentum vector equals the applied torque, a gyroscope having a large angular momentum vector influenced by a comparatively small torque will require significant time to align the angular momentum vector with the axis of rotation producing the torque.

Miniature gyroscopes have been developed and fabricated using micro-electro-mechanical systems (MEMS) technology. An exemplary MEMS sensor is disclosed in U.S. Pat. No. 5,349,855 to Bernstein et al. (hereafter the "Bernstein patent"). MEMS gyroscopes have been used in low cost and performance applications especially automobiles. MEMS gyroscopes have also been used for inertial guidance but typically in conjunction with a GPS to offset gyro inaccuracies. MEMS technology typically refers to small mechanical elements micro-machined into a silicon substrate, which may also contain microcircuitry.

An exemplary north-seeking gyroscope is disclosed in U.S. Pat. No. 5,272,922 to Watson (hereafter the "Watson patent"), the disclosure of which is incorporated herein by reference. This gyroscope uses an angular rate sensor system along with a separate drive signal generator for a motor, and a sensor output signal processing circuit. This approach, however, raises the difficulty of synchronizing the rotation of the motor with the signal processing circuit.

SUMMARY

The invention relates to a sensor system and method for determining a relative direction to true north. The system comprises at least one angular rate sensor, such as a MEMS sensor, which has an input axis and a rotation axis. The angular rate sensor comprises a motor drive structure, a motor signal output from the motor drive structure, a gyroscope, and a sensor rate output from the gyroscope for a sensor rate signal. A frequency divider is in operative communication with the motor signal output, and a spinning device is coupled to the angular rate sensor. A spinning device motor is coupled to the spinning device and is in operative communication with the frequency divider. The spinning device motor has an axis of rotation that is substantially perpendicular to the input axis of the angular rate sensor. The spinning device motor is configured to be driven by a periodic signal from the angular rate sensor. A position of the spinning device is synchronized to the periodic signal to generate a spinning device position signal. A phase detector is in operative communication with the spinning device motor and the sensor rate output. The relative direction to true north is determined from a phase differential between the spinning device position signal and the sensor rate signal.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the present invention. Further, it should be noted that although various components may be described as coupled or connected to other components, such connections and couplings can be realized by direct connection between components, or by connection through other components and devices located there between. The following detailed description is, therefore, not to be taken in a limiting sense.

The present system and method can be used to find the relative direction of true north as defined by the earth's spin axis (not magnetic north). The present north seeking system includes an angular rate sensor device where the drive signal generation for a motor comes from the sensor device itself. No external drive signal generator is required as in prior devices. The present system and method solves the problem of synchronizing the rotation of the motor with the signal processing electronics.

As discussed in further detail hereafter, the relative direction to true north is determined from the phase differential between a sensor rate signal and the table rotation angle $\Theta$ of a table rotating at a constant rate $\omega$. This phase differential is discernible by many conventional techniques such as by use of a phase detector described herein or as described in the Watson patent.

The present system can be implemented in a very small package size requiring relatively simple electronics/processing. For example, a vibrating structure gyroscope such as a MEMS gyroscope can be used in the implementation. The present implementation eliminates rate bias from the MEMs gyroscope, and provides knowledge of true north assuming that one's approximate latitude is known.

The system of the present invention can be used in many different applications where determining a direction of movement is important, such has navigation of various manned and unmanned vehicles, surveying, targeting, mining, and the like. The cost of the present system will be quite low relative to even compasses given that no scale factor calibration is required. Gyroscope bias calibration costs can also be substantially reduced given that accuracy is only driven by the change in bias over the time north seeking information is collected and not by the absolute bias accuracy.

Although the present system and method are described as follows in the context of a MEMS device, the present invention is not limited to use in a MEMS device. For example, the present system can be implemented using a ring laser gyroscope, or a fiber optic gyroscope (FOG).

Figure 1:
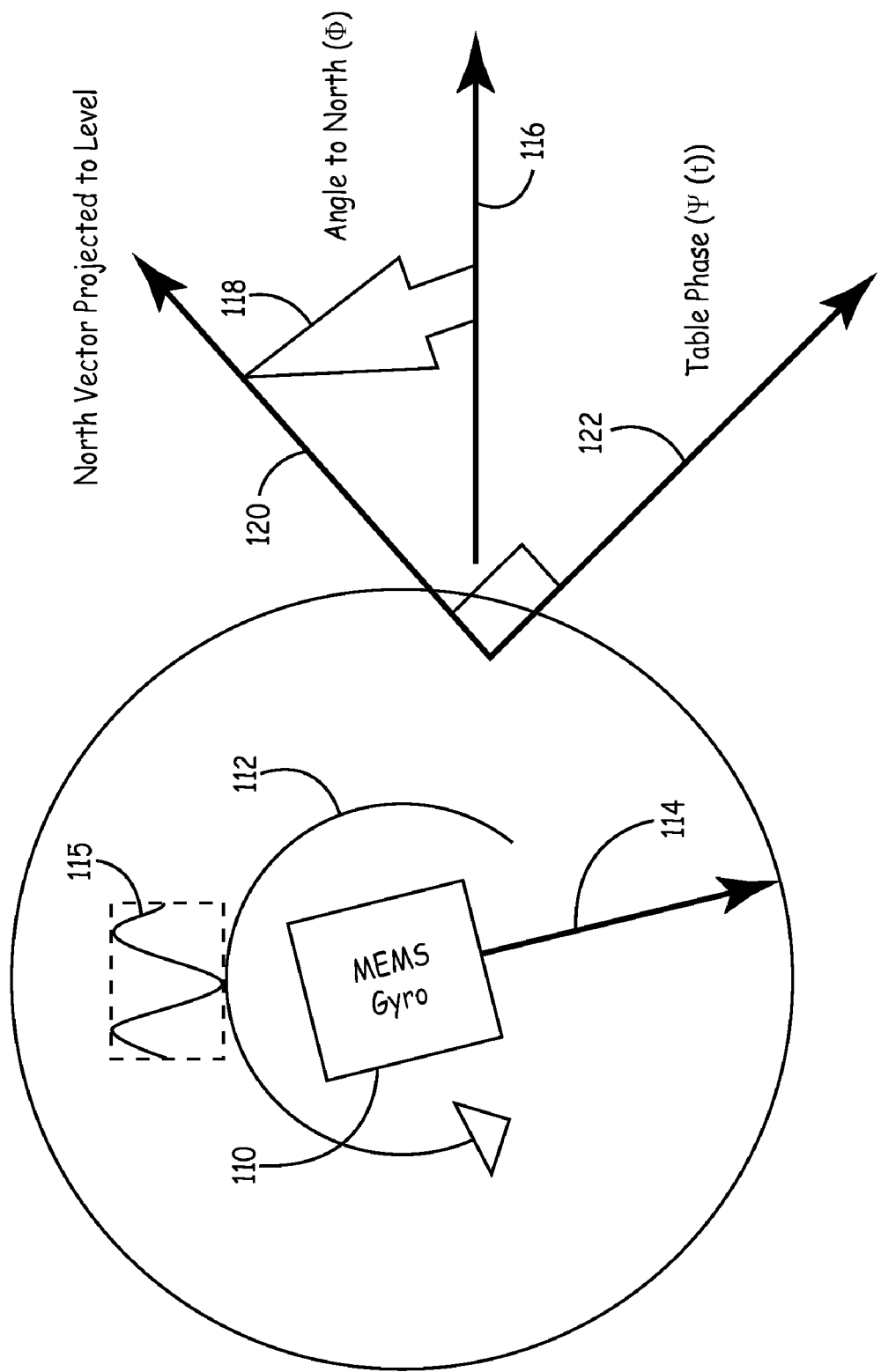
FIG. 1 is a MEMS north seeking gyroscope vector diagram.

FIG. 1 is a MEMS north seeking gyroscope vector diagram. A MEMS gyroscope (gyro) sensor 110 has an axis of rotation 112 from a spinning device such as a table or platform to which the gyroscope sensor is attached. The gyro sensor 110 rotates at a sensor motor frequency/K (K is arbitrary value), and has a gyroscope input axis 114 that is substantially coplanar with the table and substantially perpendicular to the axis of rotation 112. Rotation of gyro sensor 110 about axis of rotation 112 produces a sinusoidal sensor output signal 115 (earth rate sinusoid) with a magnitude peak corresponding to the orientation of input axis 114 of gyro sensor 110 when input axis 114 is most closely aligned with the earth's angular rate vector (i.e., spin axis or geographic north).

A local ground reference 116 is known relative to input axis 114. As discussed in further detail hereafter, the relative direction to true north is determined by measuring the phase difference between a table position signal and a sensor rate signal. A phase detector implementation can be used to measure the phase difference. This phase difference provides an angle to north 118. A north vector 120 can then be projected to level from ground reference 116 based on the angle to north 118. The north vector 120 forms a right angle with a table phase vector 122.

Figure 2:
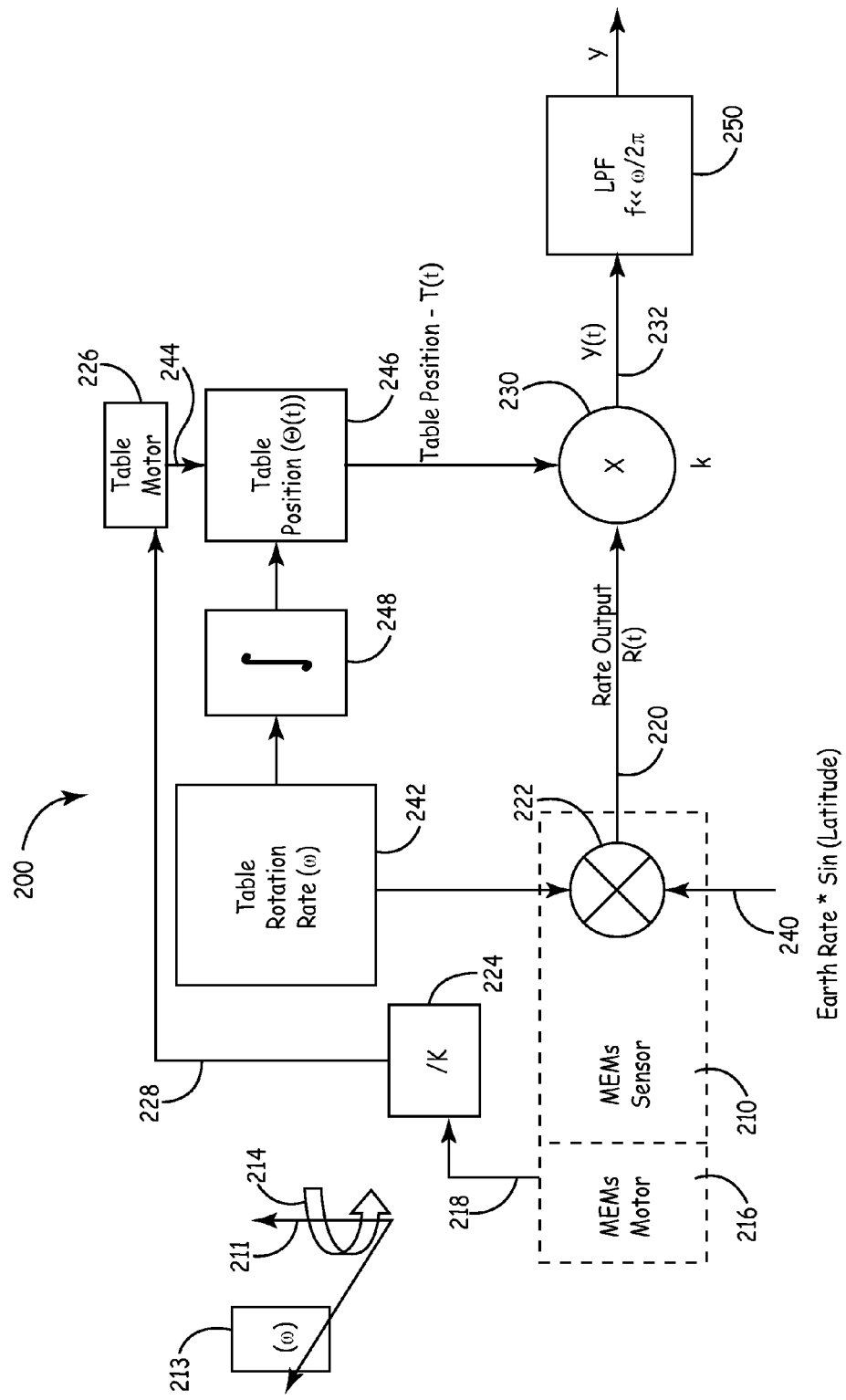
FIG. 2 is a block diagram of a MEMS sensor north seeker system according to one embodiment.

FIG. 2 is a block diagram of a MEMS sensor north seeker system 200 according to one embodiment. The system 200 includes at least one MEMS sensor 210, which is coupled to a spinning device 213 such as a rotating table. The MEMS sensor 210 has a sensor input axis 211 that is substantially perpendicular to an axis of rotation 214 of the spinning device 213. The axis of rotation 214 should be relatively aligned to local level although a precision level is not required. Small offsets in alignment are tolerable since the alignment appears as gyroscope bias, which does not affect the north seeking accuracy of system 200.

The MEMs sensor 210 includes a MEMS motor drive structure 216 having a motor signal output 218. The MEMS motor drive structure 216 is coupled to a MEMS sensor rate output 220 through a gyroscope 222. Exemplary vibrating structure MEMS gyroscopes that can be used in the present system are described in U.S. Pat. No. 7,036,373 to Johnson et al., the disclosure of which is incorporated herein by reference. Other exemplary MEMS gyroscope sensors are disclosed in the Bernstein patent, the disclosure of which is incorporated herein by reference.

A frequency divider (/K) 224 is in communication with motor signal output 218. The frequency divider 224 generally includes a circuit for splitting voltages or currents, and/or a circuit that performs mathematical division such as in a frequency counter to regulate gate time or produce a frequency controlled pulse rate.

A spinning device motor such as a table motor 226 is operatively coupled to spinning device 213 and is in operative communication with frequency divider 224 through a divider output 228. The spinning device motor has an axis of rotation that is substantially perpendicular to the input axis 211 of sensor 210. The spinning device motor is configured to be driven by the periodic signal from sensor 210, and the position of the spinning device is synchronized to the periodic signal to generate a spinning device position signal.

A phase detector or multiplier (X) 230 is in operative communication with table motor 226. The phase detector 230 is also in operative communication with sensor rate output 220. The phase detector 230 generally includes a portion of a phase-locked loop where voltage varies depending upon the phase of two oscillating input signals.

During operation of system 200, a physical earth signal 240 (earth rate*sin (latitude)) is received at input axis 211 of MEMS sensor 210. When the input axis 211 is aligned with the spin axis of the earth, the MEMS sensor 210 will read the rotation of the earth at 15 deg/hr as the input. When the input axis 211 is 90 degrees from the earth spin axis, there is no rotation to sense so there is no input. A first signal from gyroscope 222 is demodulated to get a sinusoidal sensor rate signal R(t), which is directed to phase detector 230 through sensor rate output 220. A second signal from gyroscope 222 can be demodulated to get a null signal that is 90 degrees out of phase from the sensor rate signal. The null signal can be used as a feedback signal for the sensor.

The motor signal output 218 from MEMS motor drive structure 216 provides a sinusoidal signal that corresponds to the sensor going through a frequency phase. This signal is directed to frequency divider 224 where it is divided down by an arbitrary number to place the signal into a practical range. The divided signal is then directed to table motor 226 through divider output 228 and drives table motor 226 at a certain frequency. While no particular spin rate is required for table motor 226, the spin rate should be constant and should be within the bandwidth of MEMS sensor 210.

For example, if the MEMS sensor 210 is running at 1 kHz, the signal received at frequency divider 224 is divided by an arbitrary number, such as 20, to generate a sinusoidal signal with a frequency of 50 Hz and an arbitrary amplitude. This signal is directed to table motor 226 through divider output 228 and drives table motor 226 at a frequency of 50 Hz.

A signal corresponding to a table rotation rate 242 drives modulation of the earth signal 240 onto sensor input axis 211. Thus, when the MEMS sensor is spinning, the earth rate will be modulated onto the sensor rate signal.

A table motor output 244 directs a table position signal T(t), corresponding to a table position relative to a known ground vector, from table motor 226 to phase detector 230. The position signal comprises a periodic signal corresponding to a table position 246 that has been integrated with the table rotation rate 242 through an integrator ($\int$) 248. The position signal T(t) is compared to the sensor rate signal R(t) in phase detector 230 to determine a phase difference between the position signal and the sensor rate signal. The phase difference is used to generate a phase differential output signal (Y(t)).

The phase differential output signal provides an angle to true north, which can be output to a numeric, graphic, or physical readout designating the geographic north heading on a suitable display device. For example, if there is a 90 degree phase difference between the sensor rate signal and the position signal, then the current direction is 90 degrees from the true north vector.

In an alternate embodiment, a low pass filter (LPF) 250 is in operative communication with phase detector 230. The phase differential output signal (Y(t)) can be directed from an output 232 of phase detector 230 to LPF 250 prior to determining the angle to true north. The LPF 250 makes the signal output Y independent of gyroscope bias, such that determining the angle to true north is decoupled from the gyroscope bias. Optionally, a feedback signal can be directed from the low pass filter back to the table motor in a closed loop, which is discussed further with respect to FIG. 3 hereafter.

Assuming the following definitions referenced in FIGS. 1 and 2:

$\Omega$=north vector magnitude projected to level=15°/hour·sin (latitude);

$\Omega_e$=measured north vector magnitude=$\Omega$+scale factor error;

$\Phi$=angle between gyro input axis and north vector projected to level;

k=multiplier gain;

f=table spin rate (Hz);

and the following additional definitions:

$\omega$=2$\pi$f=table spin rate in radians/second;

t=time in seconds;

B=MEMs gyro bias;

$\psi$(t)=table phase angle the following equations are defined:

$$T(t) = \text{table position relative to known ground vector} = \omega \cdot \sin(\omega \cdot t + \psi(t)); \quad (1)$$

$$R(t) = \text{measured rate using MEMs gyro} = B + \Omega_e \cdot \cos(\omega t + \Phi); \quad (2)$$

$$Y(t) = \text{signal output} = k \cdot T(t) \cdot R(t). \quad (3)$$

Note all constants are lumped into the term k. Substituting equations (1) and (2) into equation (3) results in the following equation:

$$Y(t) = k \cdot T(t) \cdot R(t) = k \cdot B \cdot \omega \cdot \sin(\omega \cdot t + \psi(t)) + k \cdot \omega \cdot \sin(\omega \cdot t + \psi(t)) \cdot \Omega_e \cdot \cos(\omega \cdot t + \Phi). \quad (4)$$

Using known trigonometric identities and substituting for term 2 of equation (4) results in the following equation:

$$Y(t) = k \cdot B \cdot \omega \cdot \sin(\omega \cdot t + \psi(t)) + k \cdot \omega \cdot \Omega_e \cdot \sin(2\omega \cdot t + \Phi + \psi) + k \cdot \omega \cdot \Omega_e \cdot \sin(\psi(t) - \Phi) \quad (5)$$

Noticeably, the gyro bias term is only present in term 1 of Equation (5). If a low pass filter is applied to the signal output, this will eliminate both terms 1 and 2 (frequency being 1× and 2× of the table rate) making the signal output independent of the gyro bias:

$$Y = k \cdot \omega \cdot \Omega_e \cdot \sin(\psi(t) - \Phi) \quad (6)$$

Intuitively this makes sense given that during a single revolution of the rate table, the MEMs sensor will be oriented with both the + and − earth's vector projected to local level. Terms 1 and 2 of equation (3) both have frequency terms that are 1× and 2× of the table speed. If the multiplier gain k is arbitrarily set to 1/$\omega$:

$$Y = (1/\omega) \cdot \omega \cdot \Omega_e \cdot \sin(\psi(t) - \Phi) = \Omega_e \cdot \sin(\psi(t) - \Phi) \quad (7)$$

If it is assumed that $\psi$(t) is constant and zero, and approximate $\Omega_e$ as $\Omega$ (earth's rate vector magnitude), the angle between earth's rate vector projected to level and the ground reference can be easily calculated by the following:

$$\Phi = -\sin^{-1}(Y/\Omega). \quad (8)$$

This approach has a couple of disadvantages in that it provides some inconvenience in that one must know the Earth's latitude, but more importantly, it brings into play gyro scale factor error inherent to the measured value $\Omega_e$. However, this problem can be eliminated by implementing a unique methodology to adjust the table angle until the phase detector output Y is zero. At this point, the adjusted table position is exactly 90 degrees out of phase with the North Vector projected to level. When this occurs the output Y (equation 7) becomes zero and the arc-sin function in equation (8) is no longer required since the arc-sin of 0 is always 90°. To make this happen, a closed feedback loop (see FIG. 3) can be defined to drive to adjust $\psi$(t) until Y is zero, and $\psi$(t)−$\Phi$=90 degrees. The angle $\psi$(t) can be known via a positional encoder or other table rotation measuring device relative to the known ground reference. The angle to north can then simply be calculated as:

$$\Phi = \sin^{-1}(0) - \psi = 90° - \psi \quad (9)$$

The accuracy will then be limited to accuracy of the table positional encoder, which provides additional flexibility on setting k in that it does not have to be precisely 1/$\omega$.

The method described in the previous paragraph could also provide latitude assuming a highly accurate gyroscope. One could drive Y to a maximum. The difference between these values would be earth's rate $\Omega_e$ and one could then determine latitude via the arc-sin calculation shown in Equation 8.

Figure 3:
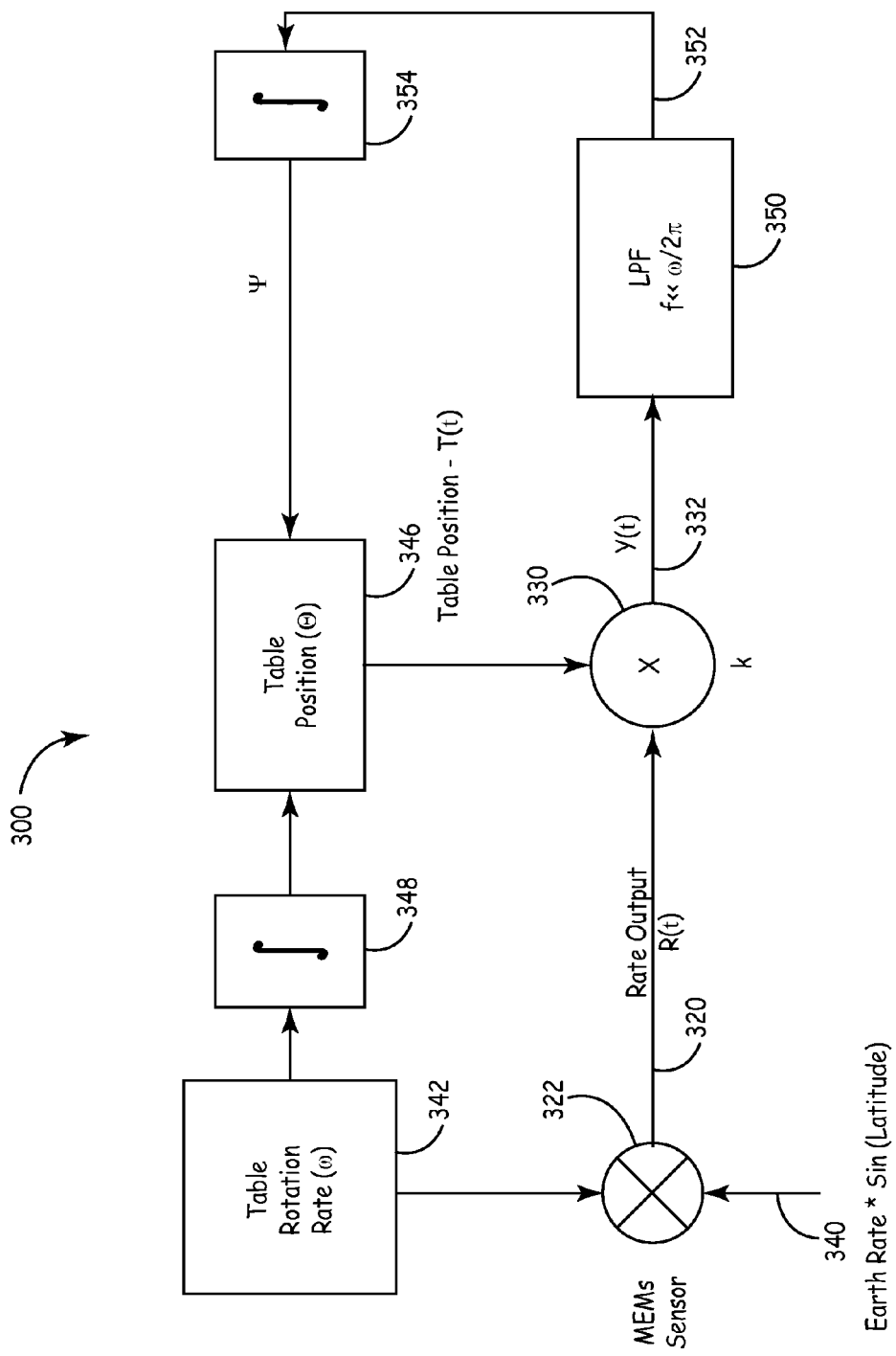
FIG. 3 is a block diagram of a MEMS sensor north seeker system according to another embodiment.

FIG. 3 is a block diagram of a MEMS sensor north seeker system 300 according to another embodiment, which can implement the closed feedback loop described above. The system 300 includes similar components as system 200 discussed previously, except for the feedback loop configuration. Accordingly, system 300 includes at least one MEMS sensor that is coupled to a spinning device such as a rotating table. The MEMs sensor includes a MEMS motor drive, which is coupled to a MEMS sensor rate output 320 through a gyroscope 322. A frequency divider is in communication with a motor signal output. A spinning device motor such as a table motor is operatively coupled to the spinning device and is in operative communication with the frequency divider. A phase detector or multiplier 330 is in operative communication with the table motor. The phase detector 330 is also in operative communication with sensor rate output 320. A low pass filter (LPF) 350 is in operative communication with phase detector 330.

During operation of system 300, a physical earth signal 340 (earth rate*sin (latitude)) is received at the input axis of the MEMS sensor. An output signal from gyroscope 322 is demodulated to get a sinusoidal sensor rate signal R(t), which is directed to phase detector 330 through sensor rate output 320. A signal corresponding to a table rotation rate 342 drives modulation of the earth signal 340 onto the sensor input axis.

A table motor output directs a table position signal T(t) to phase detector 330. The position signal comprises a sinusoidal signal corresponding to a table position 346 that has been integrated with the table rotation rate 342 through a first integrator 348. The position signal T(t) is compared to the sensor rate signal R(t) in phase detector 330 to determine a phase difference between the position signal and the sensor rate signal. The phase difference is used to generate a phase differential output signal (Y(t)), which is directed from an output 332 of phase detector 330 to LPF 350. An LPF output 352 directs a feedback signal in a closed loop to a second integrator 354, which is used to integrate the feedback signal with the table position signal from the table motor.

The closed feedback loop configuration of system 300 can be used to improve accuracy and eliminate the requirement for a calibrated rate gyroscope. The relative direction to true north is determined from the phase differential between the spinning device position signal and the sensor rate signal.

Figure 4:
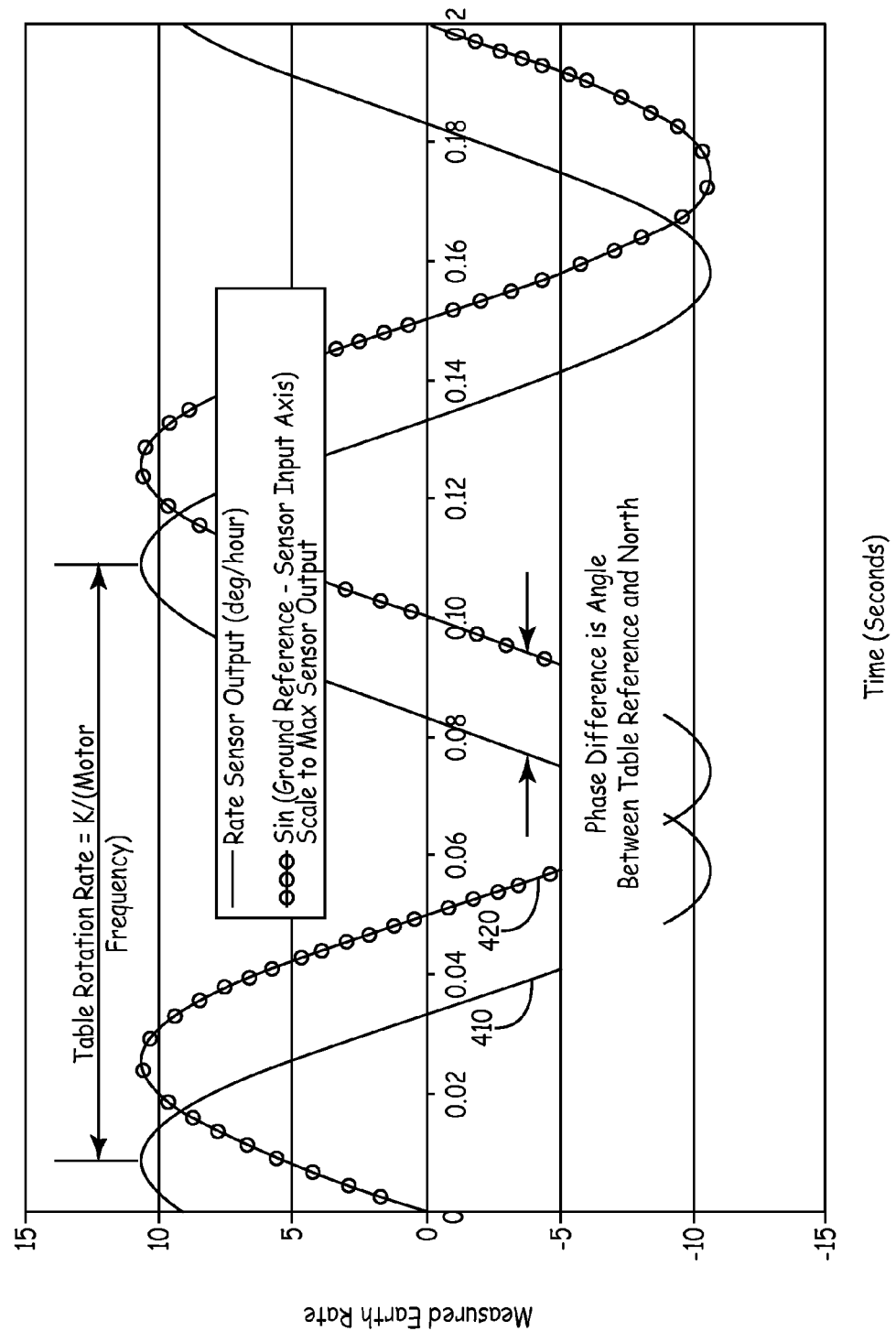
FIG. 4 is a graph showing the performance of a MEMS sensor north seeker system.

FIG. 4 is a graph showing the performance of a MEMS sensor north seeker system according to the present invention. The graph shows the measured earth rate signal with respect to time. The rate sensor signal output has a sinusoidal curve 410 corresponding to an earth rate in degrees/hour. The table reference signal output has a sinusoidal curve 420 corresponding to Sin (ground reference minus sensor input axis). The curve 420 has been scaled to the maximum sensor signal output to match its amplitude with the amplitude of curve 410 for ease of comparison. The wavelength of the sinusoidal curves corresponds to the table rotation rate which is equal to K/(motor frequency). The phase difference between curves 410 and 420 gives the angle between the table reference and true north. Thus, for example, if the phase difference is 60 degrees, then the direction to true north is at angle of 60 degrees from the current direction.

Instructions for carrying out the various process tasks, calculations, and generation of signals and other data used in the operation of the system and method of the invention can be implemented in software, firmware, or other computer readable instructions. These instructions are typically stored on any appropriate computer readable media used for storage of computer readable instructions or data structures. Such computer readable media can be any available media that can be accessed by a general purpose or special purpose computer or processor, or any programmable logic device.

Suitable computer readable media may comprise, for example, non-volatile memory devices including semiconductor memory devices such as ROM, EPROM, EEPROM, or flash memory devices; magnetic disks such as internal hard disks or removable disks; magneto-optical disks; CDs, DVDs, or other optical storage disks; non-volatile RAM, and other like media; or any other media that can be used to carry or store desired program code means in the form of computer executable instructions or data structures. Any of the foregoing may be supplemented by, or incorporated in, specially-designed application-specific integrated circuits (ASICs), or field programmable gate arrays (FPGAs). When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

The present invention may be embodied in other specific forms without departing from its essential characteristics. The described embodiments and methods are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A sensor system for determining a relative direction to true north, comprising:
    at least one angular rate sensor having an input axis and a rotation axis, the angular rate sensor comprising:
        a motor drive structure;
        a motor signal output from the motor drive structure;
        a gyroscope; and
        a sensor rate output from the gyroscope for a sensor rate signal;
    a frequency divider in operative communication with the motor signal output;
    a spinning device coupled to the angular rate sensor;
    a spinning device motor coupled to the spinning device and in operative communication with the frequency divider, the spinning device motor having an axis of rotation that is substantially perpendicular to the input axis of the angular rate sensor, the spinning device motor configured to be driven by a periodic signal from the angular rate sensor, wherein a position of the spinning device is synchronized to the periodic signal to generate a spinning device position signal;
    a phase detector in operative communication with the spinning device motor and with the sensor rate output;
    wherein the relative direction to true north is determined from a phase differential between the spinning device position signal and the sensor rate signal; and
    wherein a drive signal for the sensor motor drive structure comes from the angular rate sensor itself without an external drive signal generator.

2. The sensor system of claim 1, wherein the at least one angular rate sensor comprises a MEMS sensor.

3. The sensor system of claim 2, wherein the gyroscope comprises a MEMS-based gyroscope.

4. The sensor system of claim 1, wherein the spinning device comprises a table.

5. The sensor system of claim 4, wherein the input axis is substantially coplanar with the table.

6. The sensor system of claim 1, further comprising a low pass filter in operative communication with the phase detector.

7. The sensor system of claim 6, wherein the low pass filter is configured to direct a feedback signal back to the spinning device motor in a closed loop.

8. The sensor system of claim 7, wherein the closed loop includes an integrator.

9. A method for determining a relative direction to true north, comprising:
    providing at least one MEMS sensor having an input axis and a rotation axis, the input axis substantially perpendicular to the rotation axis, the MEMS sensor comprising a gyroscope and attached to a rotatable table having a table motor;
    spinning the MEMS sensor about the rotation axis;
    receiving a physical earth signal at the input axis;
    directing a sensor rate signal to a phase detector;
    dividing a periodic drive signal received from the MEMS sensor;
    directing the divided periodic drive signal to the table motor to drive the table at a given rotation rate, wherein a table rotation rate signal drives modulation of the earth signal onto the input axis;
    generating a table position signal from the table motor;
    directing the table position signal to the phase detector;
    comparing the table position signal to the sensor rate signal to determine a phase differential between the table position signal and the sensor rate signal; and
    determining an angle to true north based on the phase differential.

10. The method of claim 9, wherein the angle to true north is output to a display.

11. The method of claim 9, wherein the gyroscope comprises a MEMS-based gyroscope.

12. The method of claim 9, further comprising directing a phase differential output signal from the phase detector to a low pass filter prior to determining the angle to true north.

13. The method of claim 12, further comprising directing a feedback signal from the low pass filter to the table motor.

14. The method of claim 12, wherein determining the angle to true north is decoupled from a gyroscope bias.

15. The method of claim 9, wherein the table position signal comprises a periodic signal corresponding to a table position that has been integrated with the table rotation rate signal.

16. The method of claim 9, wherein the sensor rate signal comprises an earth rate sinusoidal signal whose phase peak corresponds to an orientation of a sense axis of the sensor when the sense axis is most closely aligned with earth spin axis.

17. The method of claim 9, wherein the periodic drive signal comprises a sinusoidal signal that corresponds to the sensor going through a frequency phase.

18. The method of claim 9, wherein the rotation rate is substantially constant and within a bandwidth of the sensor.

19. A sensor system for determining a relative direction to true north, comprising:
   a MEMS sensor having an input axis and a rotation axis, the MEMS sensor comprising:
   a motor drive structure;
   a motor signal output from the motor drive structure;
   a MEMS gyroscope; and
   a sensor rate output from the MEMS gyroscope for a sensor rate signal;
   a frequency divider in operative communication with the motor signal output;
   a rotatable table coupled to the MEMS sensor;
   a table motor coupled to the table and in operative communication with the frequency divider, the table motor having an axis of rotation that is substantially perpendicular to the input axis, the table motor configured to be driven by a periodic signal from the MEMS sensor, wherein a position of the table is synchronized to the periodic signal to generate a table position signal;
   a phase detector in operative communication with the table motor and with the sensor rate output;
   wherein the relative direction to true north is determined from a phase differential between the table position signal and the sensor rate signal.

20. The sensor system of claim 19, further comprising a low pass filter in operative communication with the phase detector, the low pass filter configured to direct a feedback signal back to the table motor in a closed loop.

* * * * *